United States Patent
Nightingale et al.

(10) Patent No.: US 11,556,960 B2
(45) Date of Patent: *Jan. 17, 2023

(54) METHODS AND APPARATUS TO DELIVER TARGETED ADVERTISING

(71) Applicant: THE NIELSEN COMPANY (US), LLC, New York, NY (US)

(72) Inventors: Aaron Mark Nightingale, New York City, NY (US); Juan Carlos Garcia Bazan, Brooklyn, NY (US)

(73) Assignee: The Nielsen Company (US), LLC, New York, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/391,916

(22) Filed: Aug. 2, 2021

(65) Prior Publication Data
US 2022/0036406 A1 Feb. 3, 2022

Related U.S. Application Data

(63) Continuation of application No. 15/663,059, filed on Jul. 28, 2017, now Pat. No. 11,080,756.
(Continued)

(51) Int. Cl.
*G06Q 30/02* (2012.01)
*G06N 20/00* (2019.01)

(52) U.S. Cl.
CPC ......... *G06Q 30/0269* (2013.01); *G06N 20/00* (2019.01); *G06Q 30/0251* (2013.01);
(Continued)

(58) Field of Classification Search
CPC .......... G06Q 30/0269; G06Q 30/0251; G06Q 30/0264; G06Q 30/0272; G06Q 30/0271; G06N 20/00
See application file for complete search history.

(56) References Cited

U.S. PATENT DOCUMENTS 5,848,396 A 12/1998 Gerace
5,933,811 A 8/1999 Angles et al.
(Continued)

OTHER PUBLICATIONS

Isinkaye, 2015, pp. 261-273.*
(Continued)

*Primary Examiner* — Michael I Ezewoko
(74) *Attorney, Agent, or Firm* — Hanley, Flight & Zimmerman, LLC (57) ABSTRACT

Methods and apparatus to deliver targeted advertising are disclosed. An example apparatus includes processor circuitry to: obtain user behavior information corresponding to interaction with a first media object from a user, the first media object including a first customizable media object element and a second customizable media object element independent of the first customizable media object element; analyze a performance of the first media object based on the user behavior information; and update at least one of a user profile of the user or a group profile corresponding to the user using a machine learning model to adjust ratings of the first customizable media object element and the second customizable media object element based on a comparison of the performance of the first media object to a second custom object including at least one of the first customizable media object element or the second customizable media object element.

21 Claims, 5 Drawing Sheets

Related U.S. Application Data (60) Provisional application No. 62/421,326, filed on Nov. 13, 2016.

(52) U.S. Cl.
CPC ..... *G06Q 30/0264* (2013.01); *G06Q 30/0271* (2013.01); *G06Q 30/0272* (2013.01)

(56) References Cited

U.S. PATENT DOCUMENTS

| | | | |
|---|---|---|---|
| 6,385,592 | B1 | 5/2002 | Angles et al. |
| 7,028,072 | B1 | 4/2006 | Kliger et al. |
| 7,894,448 | B1 | 2/2011 | Lillibridge et al. |
| 8,655,907 | B2 | 2/2014 | Hsiao et al. |
| 8,738,698 | B2 * | 5/2014 | Yan ................... G06Q 30/02 709/204 |
| 8,768,766 | B2 | 7/2014 | Ellis et al. |
| 8,874,727 | B2 | 10/2014 | Swahar |
| 8,886,773 | B2 | 11/2014 | Papakostas et al. |
| 8,909,248 | B2 | 12/2014 | Phillips et al. |
| 8,972,357 | B2 | 3/2015 | Shim et al. |
| 9,113,298 | B2 | 8/2015 | Qiu |
| 9,373,123 | B2 | 6/2016 | Carlson et al. |
| 9,514,446 | B1 | 12/2016 | Rajkumar et al. |
| 10,075,767 | B2 | 9/2018 | Husain et al. |
| 10,204,137 | B2 | 2/2019 | Shim et al. |
| 10,423,983 | B2 | 9/2019 | Shim et al. |
| 11,080,756 | B2 | 8/2021 | Nightingale et al. |
| 2008/0133349 | A1 | 6/2008 | Nazer et al. |
| 2009/0132347 | A1 | 5/2009 | Anderson et al. |
| 2011/0093335 | A1 | 4/2011 | Fordyce, III et al. |
| 2011/0231242 | A1 | 9/2011 | Dilling et al. |
| 2011/0276408 | A1 | 11/2011 | Toole |
| 2012/0072936 | A1 | 3/2012 | Small et al. |
| 2012/0150641 | A1 | 6/2012 | Dobbs et al. |
| 2012/0215640 | A1 * | 8/2012 | Ramer ................ G06F 16/9535 705/14.55 |
| 2014/0273923 | A1 | 9/2014 | Papakostas |
| 2015/0046579 | A1 * | 2/2015 | Perez ..................... H04L 67/02 709/224 |
| 2015/0051979 | A1 | 2/2015 | Knab et al. |
| 2015/0067162 | A1 | 3/2015 | Papakostas et al. |
| 2015/0220546 | A1 | 8/2015 | Ravindran |
| 2016/0048869 | A1 | 2/2016 | Shim et al. |
| 2017/0213240 | A1 | 7/2017 | Waldron et al. |
| 2017/0243246 | A1 | 8/2017 | Rodriguez et al. |
| 2018/0137540 | A1 | 5/2018 | Nightingale et al. |

OTHER PUBLICATIONS

United States Patent and Trademark Office, "Non-Final Office Action," issued in connection with U.S. Appl. No. 15/663,059, dated Mar. 20, 2020, 16 pages.

United States Patent and Trademark Office, "Final Office Action," issued in connection with U.S. Appl. No. 15/663,059, dated Jul. 30, 2020, 14 pages.

United States Patent and Trademark Office, "Notice of Allowance and Fee(s) Due," issued in connection with U.S. Appl. No. 15/663,059, dated Mar. 31, 2021, 15 pages.

Isinkaye et al., "Recommendation systems: Principles, methods and evaluation," Egyptian Informatics Journal, Mar. 13, 2015, 13 pages.

* cited by examiner

METHODS AND APPARATUS TO DELIVER TARGETED ADVERTISING

RELATED APPLICATIONS

This patent arises from a continuation of U.S. patent application Ser. No. 15/663,059, filed on Jul. 28, 2017, which claims priority to U.S. Provisional Patent Application Ser. No. 62/421,326, filed on Nov. 13, 2016. U.S. patent application Ser. No. 15/663,059 and U.S. Provisional Patent Application Ser. No. 62/421,326 are hereby incorporated herein by reference in their entireties. Priority to U.S. patent application Ser. No. 15/663,059 and U.S. Provisional Patent Application Ser. No. 62/421,326 is hereby claimed.

FIELD OF THE DISCLOSURE

This disclosure relates generally to monitoring media and, more particularly, to methods and apparatus to deliver targeted advertising.

BACKGROUND

Advertisers, retail establishments, product manufacturers, service providers, and other types of businesses or entities are often interested in consumer exposure and/or consumer reaction to media such as entertainment media, advertising and/or other informational media to better market their products or services. Businesses often use advertising or other informational or promotional material to draw attention and interest to their products or services. Such advertising may be delivered via television, radio, or print media. In addition, web-based technologies also offer the ability to deliver information about products and/or services via Internet advertising. Thus, the average consumer is usually exposed to media via different types of delivery devices.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

The Internet provides a network for users to access media provided by a publisher through a computing device (e.g., a computer, a phone, a tablet, a smart television, etc.). Some publishers sell space for a client to provide media objects with the publisher's media to provide to the user (e.g., via a media object server). A media object may be an advertisement, native text, a link, a pop-up, etc., that includes one or more media object elements (e.g., text, images, video, audio, etc. that may be included in the media object). For example, a video sharing website may provide advertising space to a client. In such an example, the client provides the publisher with an advertisement to present to the user before, during, or after a video output by the publisher. Additionally or alternatively, the publisher may post the advertisement on the webpage corresponding to the video. In another example, the publisher may allow a client to create its own webpage or section of a webpage to provide media (e.g. a native article) to a user to, for example, associate the client with the publisher.

To generate a more effective advertisement and/or media campaign, the client may generate multiple different advertisements and/or media objects tailored to a particular type of user. For example, surveys or other media monitoring techniques may determine that users of a first demographic (e.g. males) interact more (e.g., view, click, hover-over, etc.) with a first media object (e.g., a first video) and that users of a second demographic (e.g., females) interact more with a second media object (e.g., a second video). Accordingly, the client may want to output the first media object when a user of the first demographic accesses the publisher's media and output the second media object when a user of the second demographic accesses the publisher's media. Examples disclosed herein generate up-to-date customizable media objects to provide to a user while the user accesses media from the publisher.

Examples disclosed herein include customizing media objects for users in a campaign based on a user and/or group profile. Some examples disclosed herein include generating media from a template of one or more media object elements. The media object elements may include static elements and/or dynamic elements. The media object elements may be, for example, photos, audio, video, and/or text. A client may generate a template to determine what media object elements can be added, what media object elements must be added, what media object elements may be swapped, how the media object elements are displayed, etc. For example, a media object template may include a static header (e.g., identifying a product), a dynamic picture or video to be customized, and dynamic text to be customized, as further described in conjunction with FIG. 4. Additionally or alternatively, the text, colors, size, etc. may or may not be customized based on the media object template or other data provided by the client. In some examples, the client does not generate a media object template. In such examples, the media object may be generated in any manner.

Examples disclosed herein generate the custom media objects based on a user profile and/or a group profile. A user profile includes data related to a particular user and the group profile includes data related to one or more demographics. When a user uses a computing device to access media from a publisher, the computing device executes instructions to access the publisher's media by transmitting a media request to a publisher. The instructions may include transmitting a media request response, or more generally a response, (e.g., corresponding to a media object request) to a monitoring entity to identify that the publisher's media is being accessed. In some examples, the response includes a cookie, or other identifier, that identifies the user and/or provides data corresponding to the user and/or the access to the publisher's media (e.g., a time stamp, a location, demographics, etc.). Examples disclosed herein receive the response and (A) generates a user profile for the user or (B) determines that a user profile has already been generated for the user. If the user is new (e.g., does not include a user profile), examples disclosed herein generate a custom media object corresponding to a known demographic and/or characteristic of the user (e.g., that match a group profile) and generates a user profile for future use. If the user is not new (e.g., a user profile exists for the user), examples disclosed herein generate a custom media object corresponding to the user profile (e.g., tailored to the preferences of the user). Examples disclosed herein include forwarding the generated custom media object to the publisher to be included in the publisher media. For example, if a user accesses dogs.com using a computing device the media object customizer may receive a response generated by the computing device to generate a media object tailored for the user (e.g., using a user profile and/or a group profile). The media object customizer generates the tailored media object and transmits the media object to the publisher to be included on the dogs.com webpage.

Once the publisher outputs the custom media objects to the computing device (e.g., via a webpage), examples disclosed herein determine a performance of the media object based, in part, on the user's interaction with the customized advertisement. For example, examples disclosed herein may monitor the click-through, hover-over, duration on landing page, viewability of the media object, etc. Examples disclosed herein determine performance metrics of customized advertisement based on the monitored user interaction. The performance metrics are used to update the user profile and/or group profiles corresponding to the user. For example, if a 35-year-old Hispanic male clicks on a customized advertisement while using a computing device, examples disclosed herein (A) update the user profile for the 35-year-old Hispanic male to correspond the click to the customized media object elements of the advertisement and (B) update the group profile for Hispanics, males, and/or 30-40-year-olds to correspond the click to the customized media object elements of the advertisement. In this manner, examples disclosed herein are able to determine which media object elements are more or less successful for particular users and/or particular demographics to adjust future media object customizations, thereby providing dynamic real-time customizations of advertisements. Accordingly, if the user and/or demographic group media browsing behavior changes and/or adapts, example disclosed herein change and/or adapt with the behavior change to provide the most up-to-date media object customizations. Adapting the group profiles provides a better (e.g., more applicable) starting point for generating customizing media object for new users that don't initially have a user profile. Using examples disclosed herein hundreds of thousands or more custom advertisements may be processed to optimize future custom advertisements for a user or a group of users (e.g., based on demographics) in real-time, thereby providing an optimized up-to-date fully customized advertisement for a user and/or group of users.

For example, a user may interact more with media objects that include warm weather in the background of the image element of the media object, such that examples disclosed herein may generate more media objects for that user with warm weather backgrounds. However, as the seasons change, the user may no longer be interested or drawn to media objects with warm weather backgrounds and may stop interacting with such media objects. Accordingly, examples disclosed herein adjust the user profile to indicate that the previously successful warm weather backgrounds are no longer successful and may begin transmitting subsequent media objects corresponding to other types of backgrounds until a new successful background is identified in the user profile. Because examples disclosed herein customize media objects for a user based on a corresponding user profile and the user profile is updated based on the custom media objects provided to the user, the customizations incorporate previous user behavior, thereby optimizing the customization with subsequent media object exposure.

Figure 1:
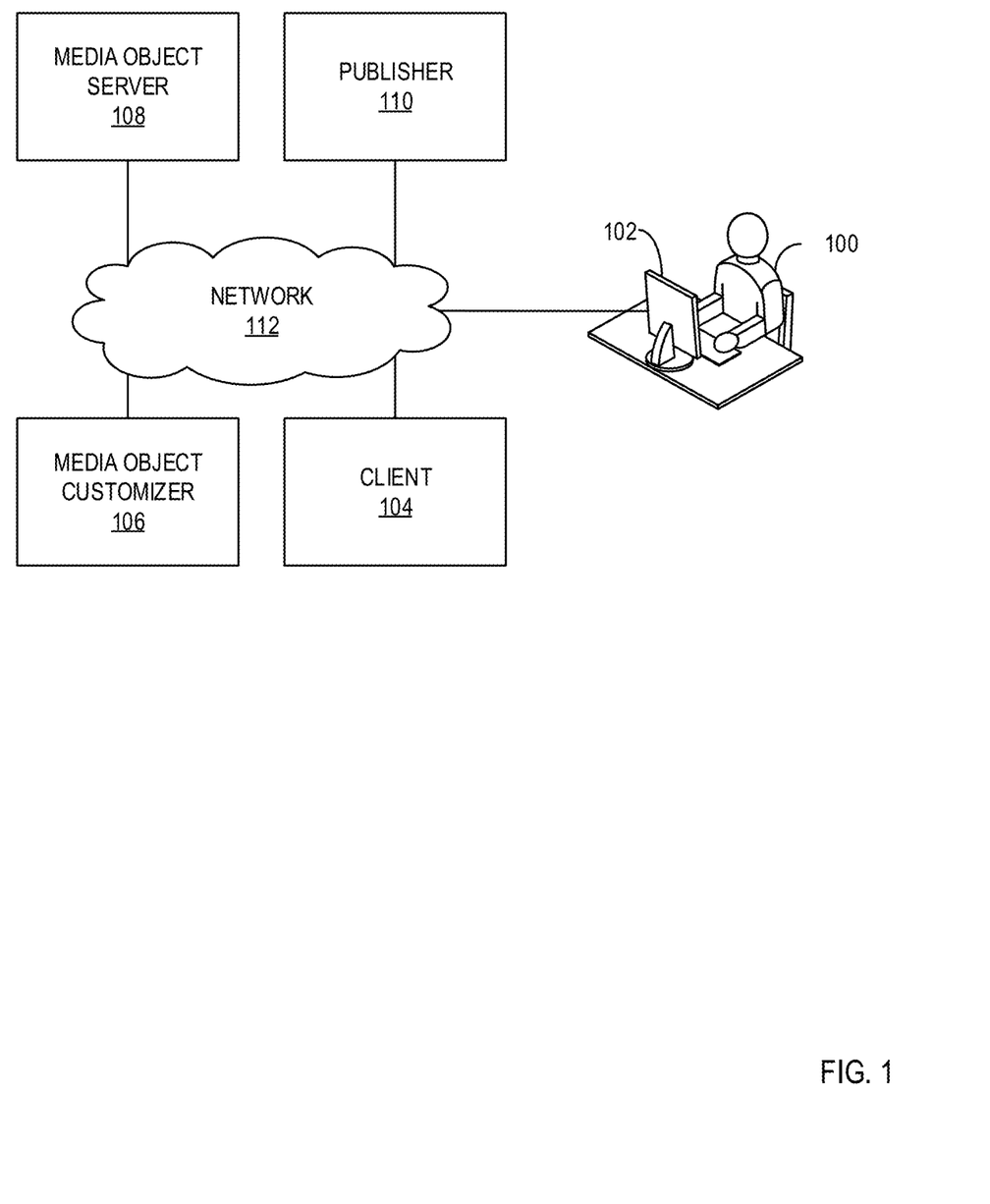
FIG. 1 is an illustration of an environment in which custom media objects is delivered to a user based on a user and/or group profile.

FIG. 1 illustrates an environment in which custom media objects is delivered to an example user 100 based on a user and/or group profile. The example of FIG. 1 includes the example user 100, an example computing device 102, an example client 104, an example media object customizer 106, an example media object server 108, an example publisher 110, and an example network 112.

The example computing device 102 of FIG. 1 is a device capable of receiving media from a network (e.g., the example network 112). Although, the example computing device 102 of FIG. 1 is illustrated as a desktop computer, the example computing device 102 may be a mobile phone, a tablet, a television, a lap top, and/or any other computing device capable of receiving media from a network. The example user 100 uses the example computing device 102 to access media (e.g., video, audio, and/or text) provided by the example publisher 110 via the example network 112. When the example computing device 102 attempts to access data from the example publisher 110, the computing device 102 executes instructions transmitted from the example publisher 110. The instructions allow the computing device 102 to output the publisher's media via a display and/or speaker of the computing device 102. In some examples, the instructions include tags that, when executed by the example computing device 102, cause the computing device 102 to transmit a media request response to a media monitoring entity (e.g., the example media object customizer 106) via the example network 112. The response may include an identifier (e.g., a cookie, a device fingerprint, an IP address, etc.), a timestamp, and/or data related to the media currently being (or previously) accessed. In some examples, the computing device 102 includes media monitoring software to monitor the behavior of the example user 100 (e.g., user behavior) (e.g., to determine media performance metrics in response to delivery of a custom media object).

The example client 104 of FIG. 1 buys advertisement space from the example media object server 108 to provide advertisements on designated websites or applications corresponding to the example publisher 110. In some examples, when the client 104 buys advertisement space, the client 104 may select a group of users corresponding to one or more demographics (e.g., data segments) to provide media objects to. Such examples, computing devices corresponding to the data segment will be pinged for serving a customized media object. In some examples, the client 104 buys space directly from the example publisher 110. For example, the publisher 110 may allow the client 104 generate a native article that looks like material produced by the example publisher 110, but is actually produced by the example client 104. In some examples, the client 104 may be the publisher 110 itself. For example, the client 104 may operate a website and may want to customize media object appearing as links to other articles within a different page of the website to drive traffic. Additionally, the example client 104 may provide a media object template (e.g., what media object elements may be included and/or the display of the such elements), media object elements (e.g., audio options, video option, text options, etc.), and/or other data to the media object customizer 106 to generate a custom media object for the example computing device 102. The other data may include rules or preferences for the custom media objects and/or independent audience research that may be used in group profiles.

The example media object customizer 106 of FIG. 1 generates custom media objects and monitors interaction with the generated custom media objects to update user and/or group profiles. When the example media object customizer 106 receives a response corresponding to an access to media by the example computing device 102 (e.g., a media request response), the example media object customizer analyzes the response to determine if the response corresponds to a user that already has a stored user profile. If the response does not correspond to a user with a stored user profile (e.g., the user is a new user), the example media object customizer 106 determines one or more demographics of the user based on the response, identifies stored group profile corresponding to the one or more demographics, and generates a custom media object based on the successful media object elements of the corresponding group profile. For example, if the response includes a location (e.g., Chicago), the example media object customizer 106 may generate a custom media object corresponding to, for example, data in a Chicago-based or urban-based profile, that identifies a particular image and particular text to use in the custom media object that has a high interaction rate in the group profile. In some examples, the image identified image and test are selected independently of each other, while in other examples the media object elements are linked. Additionally, the example media object customizer 106 generates a user profile to correspond to the new user for future customizations. If the response does correspond to a user profile, the example media object customizer 106 customizes the media object elements of an advertisement based on the user profile. For example, if the user profile includes a high-performance rating for a first media object element that corresponds to an image of a family and a second media object element that includes text identifying a sale, the media object customizer 106 may customize the advertisement to include the image of the family and the text identifying a sale.

The example media object customizer 106 of FIG. 1 transmits the custom media objects to the example publisher 110 or the example media object server 108 (e.g., who forwards the media to the example publisher 110) to be provided to the example computing device 102 via the example network 112. After the example computing device 102 receives the custom media objects (e.g., advertisement) via the example network 112, the example media object customizer 106 receives data related to interaction with the custom media objects (e.g., user behavior). For example, media metering techniques, impression collection techniques, and/or any other interaction determination techniques may be implemented by the example media object customizer 106, the example media object server 108, the example publisher 110, and/or a third party to determine if the user 100 was exposed to the custom media object, if the user 100 interacted with the custom media objects (e.g., by clicking on or hovering over the custom ad), and/or if the user 100 ignored or dismissed the custom media object. The user behavior (e.g., corresponding to the interaction, exposure, or lack of interaction) is transmitted to the example media object customizer 106 via the example network 112. The example media object customizer 106 determines a media object performance based on the user behavior and updates the user profile and/or corresponding group profiles based on the performance to optimize future customizations for the user 100 or a new user corresponding to the updated group profiles. For example, if the user 100 clicks on the custom media objects, the user profile and corresponding group profiles flag or otherwise mark the media object elements corresponding to the custom media objects as being clicked on.

The example media object server 108 of FIG. 1 provides an interface between the example client 104 and the example publisher 110. For example, the media object server 108 may be a demand side platform. The example publisher 110 may provide media via a website, application, etc. and reserve space on the website, application, etc. designed for display of media objects (e.g., advertisements, for example). The example client 104 buys advertising space to output the custom media object with the media of the publisher 110 and/or other publishers. The media object server 108 provides the publisher 110 and other publishers with media objects when the publisher's media is accessed to be presented with (e.g., before, during, or after) the publisher's media. In this manner, the example client 104 can provide media objects to the media object server 108 and the media object server 108 can distribute the advertisement across multiple publishers. As described above, the client 104 may buy space corresponding to a particular demographic(s) (e.g., data segments). Accordingly, the example media object server 108 may provide custom media objects to users corresponding to the particular data segment(s). In some examples, when the example computing device 102 accesses media of the publisher 110, the computing device 102 transmits a response to the media object server 108 and the media object server 108 pings the example media object customizer 106 to generate custom media object to be provided with the publisher's media. In such an example, the media object server 108 may receive the custom media object and transmit the custom media object to the example computing device via the network 112 (e.g., directly or via the example publisher 110).

The example network 112 is a communications network. The example network 112 allows the example computing device 102, the example client 104, the example media object customizer 106, the example media object server 108, and/or the example publisher 110 to interface with each other to provide custom media objects to the example user 100 and track the user interaction with the custom media objects via a wired and/or wireless network communication. The example network 112 may be a local area network, a wide area network, the Internet, a cloud, or any other type of communications network.

Figure 2:
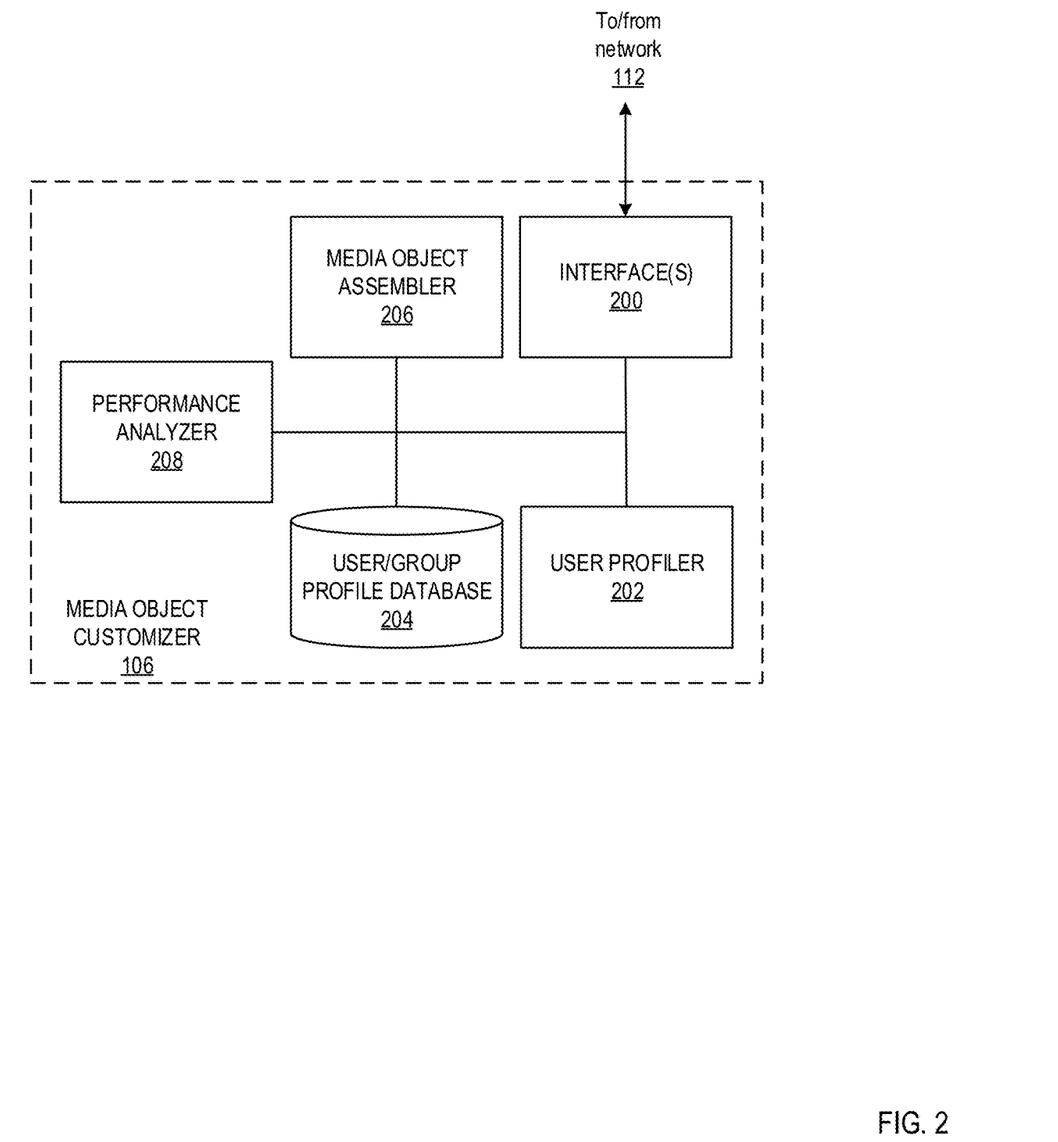
FIG. 2 is a block diagram of an example media object customizer of FIG. 1.

FIG. 2 is an example block diagram of the example media object customizer 106 of FIG. 2, disclosed herein, to generate custom media objects. While the example media object customizer 106 is described in conjunction with the environment of FIG. 1, the media object customizer 106 may be utilized to customize media in any environment. The example media object customizer 106 includes an example interface(s) 200, an example user profile 202, an example user/group profile database 204, an example media object assembler 206, and an example performance analyzer 208.

The example interface(s) 200 of FIG. 2 interfaces with the example client 104, the example media object server 108, the example publisher 110, and/or the example computing device 102 via the example network 112 of FIG. 1. For example, the example interface(s) 200 may receive (A) templates, media object elements, and/or other data from the example client 104, (B) identifiers and/or demographics corresponding to the example computing device 102 from the example media object server 108 and/or the example publisher 110, and/or (C) user behavior corresponding to the example computing device 102 from the example media object server 108, the example publisher 110, the example computing device 102, and/or any other device. Additionally, the example interface(s) 200 transmits custom media objects to the example computing device 102 (e.g., directly or via the example media object server 108 or the example publisher 110). The example interface(s) 200 may be a single interface or multiple interfaces to communicate with multiple devices.

The example user profiler 202 of FIG. 2 generates and/or updates user and/or group profiles stored in the example user/group profile database 204. When the example interface(s) 200 receives a response corresponding to accessing media of the example publisher 110, the example user profiler 202 processes the response to determine if the response corresponds to a known user (e.g., a user who already has a user profile stored in the example user/group profile database 204), or if the response corresponds to an unknown user. When the example user profiler 202 determines that the response corresponds to an unknown user, the example user profiler 202 generates a new user profile for the unknown user. In some examples, a response may be from a known user, but the response may not directly correspond to a stored user profile. For example, the example user 100 may have a user profile corresponding to a first cookie. If the user 100 deletes the cookies of the computing device 102, subsequent cookies will no longer correspond to the user profile for the user 100. Accordingly, when the user profiler 202 determines that the response corresponds to an unknown user, the example user profiler 202 may attempt to match the response to a user profile (e.g., based on a matching IP address, a cookie mapping, and/or any other matching technique).

Figure 4:
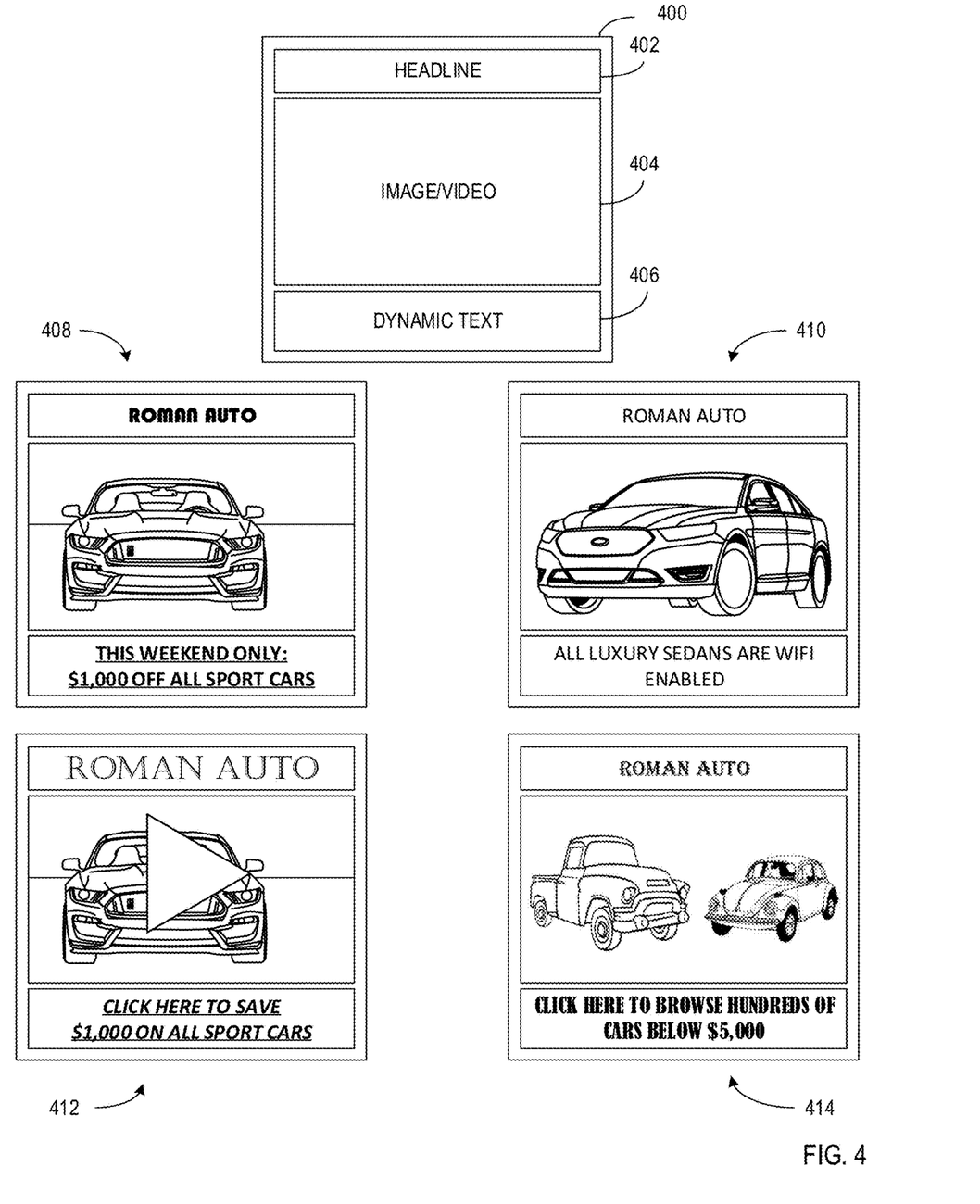
FIG. 4 illustrate an example media object template used to generate example custom media objects.

The example user/group profile database 204 of FIG. 4 stores the user and/or group profiles. The group profiles correspond to different demographics and/or combination of demographics. For example, there may be an age-based profile, a gender-based profile, a race-based profile, a user behaviors-based profile, etc., and/or any combination thereof. A group profile includes ratings (e.g., performance rating) corresponding to a particular group for media object elements and/or object element combinations that may be updated with user interaction with a custom media objects corresponding to users of the group. A user profile includes ratings corresponding to a particular user for media object elements and/or media object element combinations that may be updated based on interaction with a custom media objects corresponding to the user. If a user profile and/or a group profile does not include ratings for one or more media object elements, the one or more media object elements may be flagged or otherwise marked as not being previously used or analyzed in a custom media object for the corresponding user and/or group.

The example media object assembler 206 of FIG. 2, assembles custom media objects for the user 100 based on a user profile or group profile corresponding to the user 100. When the example interface(s) 200 receives a response corresponding to access of the publisher's media on the example computing device 102 and the response corresponds to a user profile (e.g., stored in the example user/group profile database 204), the example media object assembler 206 gathers media object elements based on the user profile (e.g., stored in the example user/group profile database 204) to generate a custom media object to provide to the user 100 with the publisher's media. The example media object assembler 206 gathers the media object elements for a custom media object based on media object elements and/or a media object template from the example client 104 of FIG. 1. The example media object assembler 206 gathers the media object elements based on the ratings in the example user profile. For example, if a particular image element has a high rating, the example media object assembler 206 may include the image element as one of the media object elements in the media object. In some examples, the media object assembler 206 adjusts combination of media object elements to identify an optimal (e.g., highest rating) combination of media object elements. In some examples, the media object assembler 206 tests previously unused media object elements and/or media object element combinations to determine which media object elements and/or combination has the highest rating for the user and/or group.

The example performance analyzer 208 of FIG. 2 analyzes the performance of a custom media object based on user behavior received in response to providing the custom media object to the example computing device 102 with the publisher's media. In some examples, the example performance analyzer 208 applies a rating (e.g., weight) to the media object elements of the custom media object and/or the combination of the media object elements of the custom media object. Additionally, the example performance analyzer 208 of FIG. 2 updates the user and/or group profiles based on the performance of the custom media objects. For example, when the user 100 interacts with a custom media objects, the example performance analyzer 208 may update the user profile to increase the rating of the media object elements and/or the media object element combination in the user profile and/or group profile corresponding to the user 100. The amount of increase and/or decrease to the rating may be based on how the user interacts or does not interact with the custom media. For example, the performance analyzer 208 applies a higher rating to media object elements corresponding to a media object that was clicked on than a media object element that was hovered-over but not clicked on. In another example, the performance analyzer 208 may rate media object elements corresponding to a media object that was provided to the user but not actually seen by the user (e.g., the media object was provided at the bottom of a webpage and the user did not scroll down far enough to see the provided memory object) with a neutral (e.g., 0) rating. In another example, the performance analyzer 208 may apply a negative weight to media object elements corresponding to a media object that was not interacted with or the user took an active step to get rid of the custom media object. Such an active step may include a close of the media object, an exit of the media object, a minimization of the media object, a skip of the media object, etc. In some examples, the performance analyzer 208 add different values (e.g., weights) corresponding to the user behavior (e.g., interaction) with the custom add into a matrix. In such examples, the performance analyzer 208 processes the data in a data neural network with machine learning in real time to process and determine the media object elements, thereby determining the optimal media object based on past (e.g., but constantly updated) user behavior data. Because a custom media object may include multiple custom media object elements with a plurality of options for each media object element, there may be thousands or more possible combination of media object elements for a custom media object. Accordingly, the example performance analyzer 208 may utilize neural network, machine learning algorithms, and/or other comparison techniques to determine the weights/rating for the individual media object elements in a media object (e.g., which media object elements and/or combination is more likely responsible for a user interaction). In this manner, the example performance analyzer 208 tracks the performance of individual media object elements by comparing hundreds of thousands of media object elements and/or combination of media object elements to determine an optimal custom media object, in real-time or near real-time.

In some examples, the performance analyzer 208 analyzes the performance of multiple customized media objects to identify patterns and/or which parts of the customized media object is the most effective. In some examples, the performance analyzer 208 determines the effectiveness of the media object elements based on a neural network analysis (e.g., machine learning algorithms). In some examples, the performance analyzer 208 may adjust the weights of the media object elements to correspond to the move effective elements. For examples, the example media object assembler 206 may generate a number (e.g., hundreds, thousands, millions, etc.) of customized media objects for a person and/or demographic group. The example performance analyzer 208 may process the number of customized media objects to find patterns of user interactivity based on the customized media objects. The performance analyzer 208 may determine group the media objects based on user interactivity and identify patterns of the custom media object elements based on the groups. For example, if multiple custom media objects include a particular element (e.g., particular photo, a particular phrase, a particular color, etc.) and/or a particular combination of media objects, etc., the example performance analyzer 208 may determine the weight the custom media object element and/or combination highly based on such effectiveness. In this manner, the example media object assembler 206 is able to continue to tweak the custom media objects based on the weights for the elements and/or combination of elements determined by the performance analyzer 208. Accordingly, the continuous performance analyzation of the performance analyzer 208 and the customization of the example media object assembler 206 work together to generate the most optimal custom media object for a user and/or a demographic based on thousands or more custom media object analysis.

While example manners of implementing the example media object customizer 106 of FIG. 1 is illustrated in FIG. 2, elements, processes and/or devices illustrated in FIG. 2 may be combined, divided, re-arranged, omitted, eliminated and/or implemented in any other way. Further, the example interface(s) 200, the example user profiler 202, the example user/group profile database 204, the example media object assembler 206, the example performance analyzer 208, and/or, more generally, the example media object customizer 106 of FIG. 2, may be implemented by hardware, machine readable instructions, software, firmware and/or any combination of hardware, machine readable instructions, software and/or firmware. Thus, for example, any of the example interface(s) 200, the example user profiler 202, the example user/group profile database 204, the example media object assembler 206, the example performance analyzer 208, and/or, more generally, the example media object customizer 106 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface(s) 200, the example user profiler 202, the example user/group profile database 204, the example media object assembler 206, the example performance analyzer 208, and/or, more generally, the example media object customizer 106 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example media object customizer 106 of FIG. 2 includes elements, processes and/or devices in addition to, or instead of, those illustrated in FIG. 3, and/or may include more than one of any or all of the illustrated elements, processes and devices.

Figure 3:
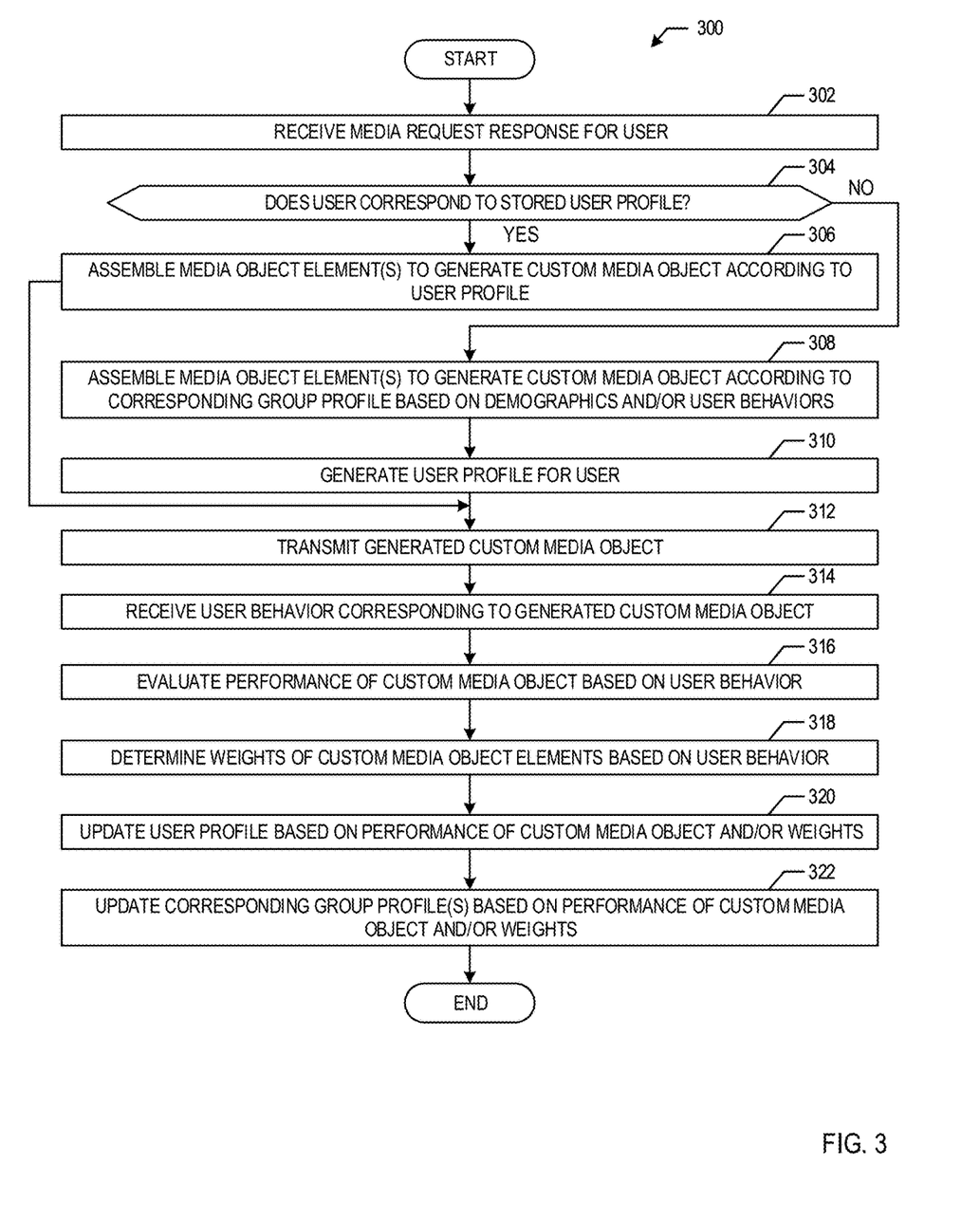
FIG. 3 is a flowchart representative of example machine readable instructions that may be executed to implement the example media object customizer of FIGS. 1 and 2 to generate custom media objects.

A flowchart representative of example machine readable instructions for implementing the example media object customizer 106 of FIG. 1 is shown in FIG. 3. In the examples, the machine readable instructions comprise a program for execution by a processor such as the processor 512 shown in the example processor platform 500 discussed below in connection with FIG. 5. The program may be embodied in machine readable instructions stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example media object customizer 106 of FIGS. 1 and 2 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example media object customizer 106 of FIGS. 1 and 2 to generate custom media objects for the example user 100 of FIG. 1. Although the instructions of FIG. 3 are described in conjunction with the example media object customizer 106 of FIGS. 1 and 2, the example instructions may be utilized by any type of media object customizer in any type of environment.

At block 302, the example interface(s) 200 receives a media request response corresponding to the example user 100 via the example network 112 of FIG. 1. At block 304, the example user profiler 202 determines if the example user 100 corresponds to a stored user profile in the example user/group profile database 204. For example, if the media request response includes a cookie, the user profiler 202 determines if the user 100 corresponds to a stored user profile by querying the example user/group profile database 204 for a user profile corresponding to the cookie. If the example user profiler 202 determines that the example user 100 corresponds to a stored user profile (block 304: YES), the example media object assembler 206 assembles one or more media object elements to generate a custom media object according to the corresponding user profile (block 306). For example, the example media object assembler 206 may determine, based on the ratings in the user profile, that media object including an image element of particular product being used by a family, with a text element corresponding to a sale has a high rating when the media object is requested during summer days. Accordingly, if the media request is received during a summer day, the example media object assembler 206 selects the first element (e.g., the family image element) and the second element (e.g., the sale text) to generate the custom media object. The number, size, text, color, etc. of the media object elements may be based on the user profile and/or may be based on a media object template (e.g., customized by the client 104).

If the example user profiler 202 determines that the example user 100 does not correspond to a stored user profile (block 304: NO), the example media object assembler 206 assembles one or more media object elements to generate a custom media object according to the corresponding group profile (block 308). The example user profiler 202 processes the data from the media request response to determine one or more demographics of the unknown user and/or the media that the user 100 is trying to access. Even though the user is unknown, there is some data that the example media object assembler 206 may use to identify a corresponding group profile. For example, if the media that the user 100 is trying to access that triggers the media request response corresponds to a first type of media (e.g., sports media), the example media object assembler 206 may generate a media object corresponding to a sports lover based group profile. In another example, the media request may include a location of the user, thereby allowing the example media object assembler 206 to assemble one or more media object elements to generate a custom media object according to a location based group profile.

At block 310, the example user profiler 202 generates a new profile for the unknown user based on the identifier corresponding to the example media request response. In this manner, when the example interface(s) 200 receives a subsequent media request response, the example media object customizer 106 can generate a more optimal custom media object for the unknown user based on previous custom media objects provided to the previously unknown (e.g., now known) user. At block 312, the example interface(s) transmits the generated custom media object to the example computing device 102 via the example network 112 (e.g., directly or via the example media object server 108 or the example publisher 110). At block 314, the example interface(s) 200 receives user behavior corresponding to the generated custom media object. The example interface(s) 200 may receive the user behavior from the media object server 108, the publisher 110, directly from the computing device 102, and/or any other device capable of monitoring user behavior (e.g., interaction) corresponding to the custom media. The user behavior may include, for example, click through, hover-over, duration of hover-over, duration of display time, percentage of display (e.g., how much of the media object was actually displayed or output to the user 100), dismissal of the add (e.g., corresponding to a media object close, exit, minimize, skip, etc.). At block 316, the example performance analyzer 208 evaluates performance of the custom media object based on the user behavior.

At block 318, the example performance analyzer 208 determines weights of the custom media object elements based on the user behavior. In some examples, the performance analyzer 208 determines a numerical value (e.g., a weight) for the media object elements and/or media object element combination corresponding to the custom media object. For example, the performance analyzer 208 may compare the individual custom media object elements, combination of media object element, and/or sub-combination of media object elements to the performance of custom media object elements, combination of media object element, and/or sub-combination of media object elements of previously used media objects to determine how to weight the individual media object elements of the custom media object. In this manner, the weights of the individual media object elements, combination of media object elements, and/or sub-combination of media object elements can adapt over time (e.g., as user interaction changes). In some examples, the performance analyzer 208 determines the weights of the custom media object elements using a neural network analysis to determine which media objects should receive higher weights based on a comparison with previously utilized custom media objects with overlapping custom media object elements.

In block 320, the example user profiler 202 updates the user profile based on the performance of the custom media object. In some examples, the performance analyzer 208 applies the numerical values to the to the media object elements and/or media object element combination corresponding to the custom media object in the user profile corresponding to the user 100. In some examples, the performance analyzer 208 adds the different values (e.g., weights) corresponding to the user behavior (e.g., interaction) with the custom media object into a matrix of the user profile. In such examples, the matrix may be processed in a data neural network with machine learning in real time to update the media object element in the corresponding user profile, thereby determining the optimal media object based on past (e.g., but constantly updated) user behavior data. At block 322, the example user profiler 202 updates one or more corresponding group profiles based on the performance of the custom media object. The user profiler 202 updates the one or more corresponding group profiles in a similar manner to the update to the user profile.

FIG. 4 illustrate an example media object template 400 used to generate example custom media objects 408, 410, 412, 414. The example media object template 400 includes an example headline element 402, an example image/video element 404, and an example dynamic text element 406.

The example media object template 400 of FIG. 4 is a template that may be provided by the example client 104 and/or be generated by the example media object customizer 106 based on the media object elements and/or data provided by the example client 104. Although the example media object template 400 includes three customizable media object elements (e.g., the example elements 402, 404, 406) in a particular layout, the example media object template 400 may include any number, size, and/or layout of media object elements. In the illustrated example, the example headline element 402, the example image/video element 404, and/or the example dynamic text element 406 are customizable based on client preferences. For example, the example headline element 402 may be customized to change the font, size of the font, background color, font color, etc. The example image/video element 404 may be customized to change the actual image and/or video used. The example dynamic text element 406 may be customized to include different text, different font, different text color, different background color, etc.

The example custom media objects 408, 410, 412, 414 of FIG. 4 illustrate different example customizations based on the example media object template 400. As illustrated in FIG. 4, the location and text of the example headline element 402 may be locked (e.g., based on rules/preferences of the example client 104); however, the font, color, size, etc. of the headline element 402 may be customizable. The example image/video element 404 of the example custom media objects 408, 410, 412, 414 is customizable based on images and/or video elements provided by the example client 104. For example, the video element corresponding to a sport car of the example media object 412 may correspond to a high rating for users within a first age range or a first user profile, while the image element corresponding to antique cars of the example media object 414 may correspond a high rating for users within a second age range or a second user profile. The example dynamic text element 406 of the example custom media objects 408, 410, 412, 414 is customized based on actual text, font, size, etc. For example, the dynamic text element of the example custom media object 410 may correspond to a user that performs highly (e.g., frequently interacts) with dynamic text corresponding to luxury items and/or technology items, while the dynamic text element of the example custom media object 414 may correspond to a user that performs highly with dynamic text corresponding to low prices and antique cars.

Figure 5:
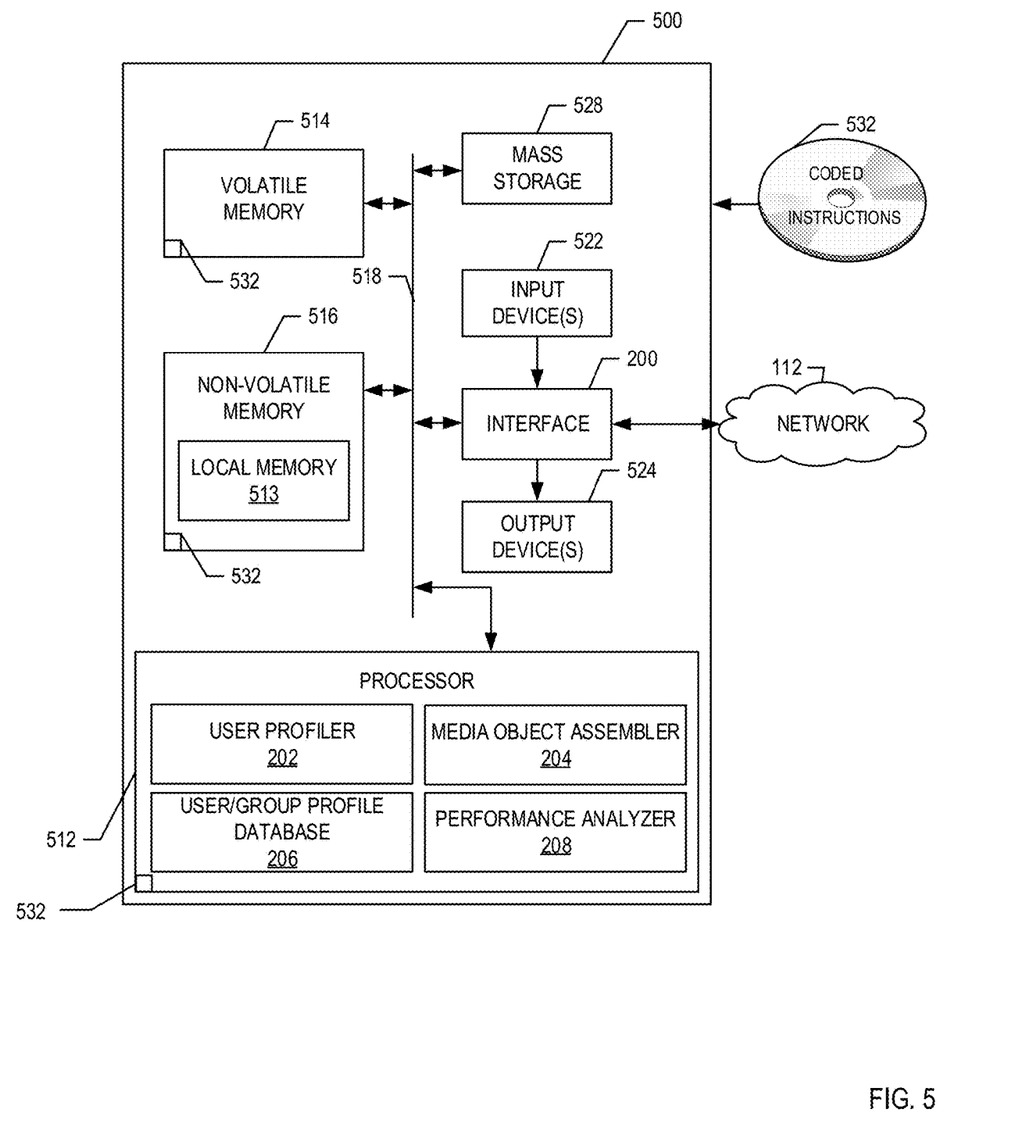
FIG. 5 is a block diagram of a processor platform structured to execute the example machine readable instructions of FIG. 3 to control the example media object customizer of FIGS. 1 and 2.

FIG. 5 is a block diagram of an example processor platform 500 capable of executing the instructions of FIG. 3 to implement the example media object customizer 106 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by integrated circuits, logic circuits, microprocessors or controllers from any desired family or manufacturer.

The processor 512 of the illustrated example includes a local memory 513 (e.g., a cache). The example processor 512 of FIG. 5 executes the instructions of FIG. 3 to implement the example interface(s) 200, the example user profiler 202, the example user/group profile database 204, the example media object assembler 206, the example performance analyzer 208 of FIG. 2 to implement the example media object customizer 106. The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a clock controller.

The processor platform 500 of the illustrated example also includes an interface circuit 200. The interface circuit 200 may be implemented by any type of interface standard, such as an Ethernet interface, a universal serial bus (USB), and/or a PCI express interface.

In the illustrated example, one or more input devices 522 are connected to the interface circuit 200. The input device(s) 522 permit(s) a user to enter data and commands into the processor 512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 524 are also connected to the interface circuit 200 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 200 of the illustrated example, thus, typically includes a graphics driver card, a graphics driver chip or a graphics driver processor.

The interface circuit 200 of the illustrated example also includes a communication device such as a transmitter, a receiver, a transceiver, a modem and/or network interface card to facilitate exchange of data with external machines (e.g., computing devices of any kind) via a network 112 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 3 may be stored in the mass storage device 528, in the volatile memory 514, in the non-volatile memory 516, and/or on a removable tangible computer readable storage medium such as a CD or DVD.

From the foregoing, it would be appreciated that the above disclosed method, apparatus, and articles of manufacture to deliver targeted advertising. Examples disclosed herein provide up-to-date custom media objects to a user accessing media from a publisher. Examples disclosed herein generate and maintain user and group profiles corresponding to user interaction with custom memory objects with one or more custom memory object elements. In this manner, as the user and/or group behavior changes, the user and group profiles are likewise updated, thereby allowing the custom memory object to be up-to-date and adjustable to current user and/or group preferences.

Traditional techniques for providing advertisements to users include developing an advertisement for a group of people and applying the advertisement to members of the group. However, such traditional techniques do not allow for customizability of user's preferences within the group and do not adjust as the group and/or user preferences (e.g. user behavior changes), thereby causing significant time and cost to change a media campaign. Additionally, traditional techniques do not allow for multiple independently customizable media object elements. Examples disclosed herein alleviate the problems of such traditional techniques by tracking the performance of individual media object elements for a user in real-time and updating user and group profiles in response to an interaction with a media object. Examples disclosed herein track the performance of individual media object elements by comparing hundreds of thousands of media object elements and/or combination of media object elements to determine an optimal custom media object. In this manner, customized media objects remain up to date and are significantly more accurate than traditional advertising techniques.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. An apparatus comprising:
   memory;
   instructions included in the apparatus; and
   processor circuitry to execute the instruction to at least:
      cause transmission of a first media object to a computing device of a user via a network communication, the first media object including a first customizable media object element and a second customizable media object element independent of the first customizable media object element;
      obtain user behavior information corresponding to interaction with the first media object from the user;
      analyze a performance of the first media object based on the user behavior information; and
      adjust weights in a matrix to update at least one of a user profile of the user or a group profile corresponding to the user in real-time using a machine learning model to adjust ratings of the first customizable media object element and the second customizable media object element based on a comparison of the performance of the first media object to a second media object including at least one of the first customizable media object element or the second customizable media object element.

2. The apparatus of claim 1, wherein the processor circuitry is to analyze the performance by determining at least one of how the first media object was presented or how the user interacted with the first media object.

3. The apparatus of claim 1, wherein the group profile corresponds to a demographic.

4. The apparatus of claim 1, wherein the first customizable media object element and the second customizable media object element includes at least one of text, audio, video, or an image.

5. The apparatus of claim 1, wherein the processor circuitry is to, in response to receiving a request to provide a media object:
   generate the first customizable media object element to include in the first media object, the first customizable media object element based on at least one of the user profile or the group profile corresponding to the user, the user corresponding to the request; and
   generate the second customizable media object element independent of the first customizable media object element to include in the first media object, the second customizable media object element based on at least one of the user profile or the group profile corresponding to the user.

6. The apparatus of claim 5, wherein the processor circuitry is to:
   when the request corresponds to a new user, generate the first media object based on the group profile corresponding to a demographic of the new user; and
   when the request corresponds to an old user, generate the first media object based on the user profile corresponding to the old user.

7. The apparatus of claim 1, wherein the processor circuitry is to adjust the ratings of the first customizable media object element and the second customizable media object element by increasing the ratings when at least one of a mouse of the user hovers over the first media object or the user clicks on the first media object.

8. An apparatus comprising:
   means for transmitting a first media object to a computing device of a user via a network communication, the first media object including a first customizable media object element and a second customizable media object element independent of the first customizable media object element;
   means for obtaining user behavior information corresponding to interaction with the first media object from the user; and
   means for updating a profile, the means for updating to:
      analyze a performance of the first media object based on the user behavior information; and
      adjust weights in a matrix to update at least one of a user profile of the user or a group profile corresponding to the user in real-time using a machine learning model to adjust ratings of the first customizable media object element and the second customizable media object element based on a comparison of the performance of the first media object to a second custom object including at least one of the first customizable media object element or the second customizable media object element.

9. The apparatus of claim 8, wherein the means for updating is to analyze the performance by determining at least one of how the first media object was presented or how the user interacted with the first media object.

10. The apparatus of claim 8, wherein the group profile corresponds to a demographic.

11. The apparatus of claim 8, wherein the first customizable media object element and the second customizable media object element includes at least one of text, audio, video, or an image.

12. The apparatus of claim 8, further including:
   means for generating the first media object, the means for generating to:
      generate the first customizable media object element to include in the first media object in response to receiving a request to provide the first media object, the first customizable media object element based on at least one of the user profile or the group profile corresponding to the user, the user corresponding to the request; and
      generate the second customizable media object element independent of the first customizable media object element to include in the first media object, the second customizable media object element based on at least one of the user profile or the group profile corresponding to the user.

13. The apparatus of claim 12, wherein the means for generating is to:
when the request corresponds to a new user, generate the first media object based on the group profile corresponding to a demographic of the new user; and
when the request corresponds to an old user, generate the first media object based on the user profile corresponding to the old user.

14. The apparatus of claim 8, wherein the means for updating is to adjust the ratings of the first customizable media object element and the second customizable media object element by increasing the ratings when at least one of a mouse of the user hovers over the first media object or the user clicks on the first media object.

15. A non-transitory computer readable storage medium comprising instruction which, when executed, cause one or more processors to at least:
cause transmission of a first media object to a computing device of a user via a network communication, the first media object including a first customizable media object element and a second customizable media object element independent of the first customizable media object element;
analyze a performance of the first media object based on user behavior information corresponding to interaction with the first media object by the user; and
adjust weights in a matrix to update at least one of a user profile of the user or a group profile corresponding to the user in real-time using a machine learning model to adjust ratings of the first customizable media object element and the second customizable media object element based on a comparison of the performance of the first media object to a second custom object including at least one of the first customizable media object element or the second customizable media object element.

16. The non-transitory computer readable storage medium of claim 15, wherein the instructions cause the one or more processors to analyze the performance by determining at least one of how the first media object was presented or how the user interacted with the first media object.

17. The non-transitory computer readable storage medium of claim 15, wherein the group profile corresponds to a demographic.

18. The non-transitory computer readable storage medium of claim 15, wherein the first customizable media object element and the second customizable media object element includes at least one of text, audio, video, or an image.

19. The non-transitory computer readable storage medium of claim 15, wherein the instructions cause the one or more processors to, in response to receiving a request to provide a media object:
generate the first customizable media object element to include in the first media object, the first customizable media object element based on at least one of the user profile or the group profile corresponding to the user, the user corresponding to the request; and
generate the second customizable media object element independent of the first customizable media object element to include in the first media object, the second customizable media object element based on at least one of the user profile or the group profile corresponding to the user.

20. The non-transitory computer readable storage medium of claim 19, wherein the instructions cause the one or more processors to:
when the request corresponds to a new user, generate the first media object based on the group profile corresponding to a demographic of the new user; and
when the request corresponds to an old user, generate the first media object based on the user profile corresponding to the old user.

21. The non-transitory computer readable storage medium of claim 15, wherein the instructions cause the one or more processors to adjust the ratings of the first customizable media object element and the second customizable media object element by increasing the ratings when at least one of a mouse of the user hovers over the first media object or the user clicks on the first media object.

* * * * *